Nov. 26, 1957 — B. MENDEZ — 2,814,401
VEHICLE LOADING ASSEMBLY
Filed Aug. 23, 1955
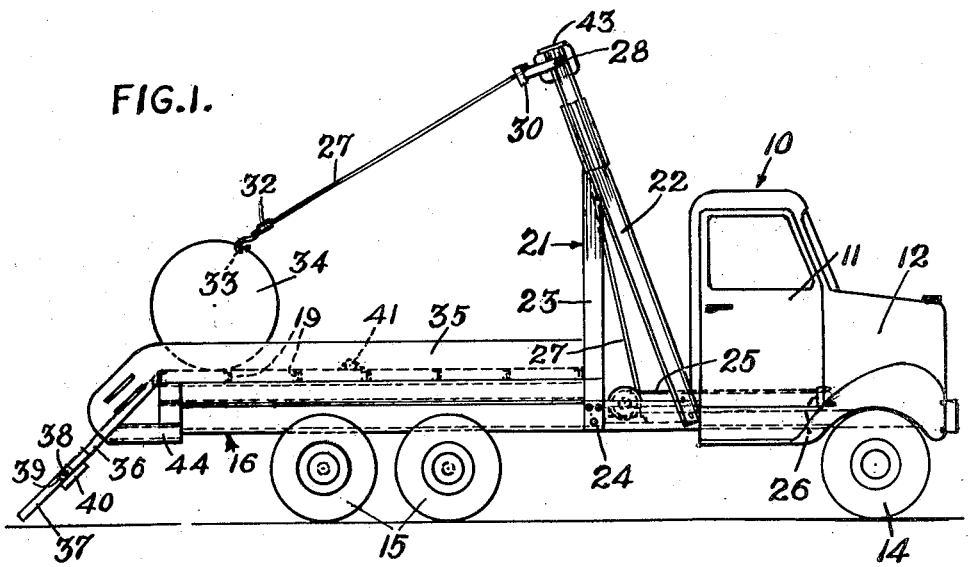
INVENTOR.
Bernardo Méndez.

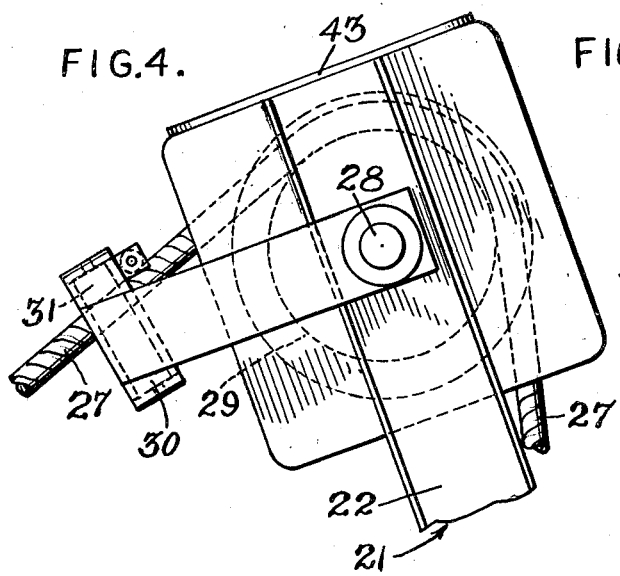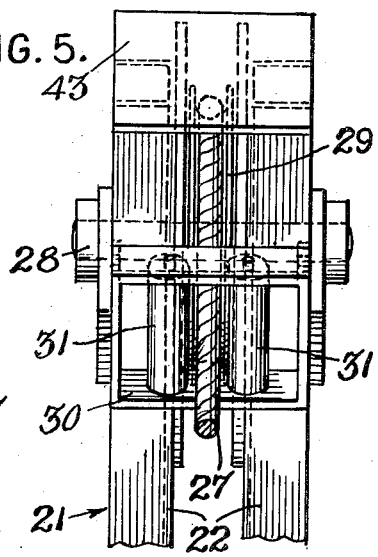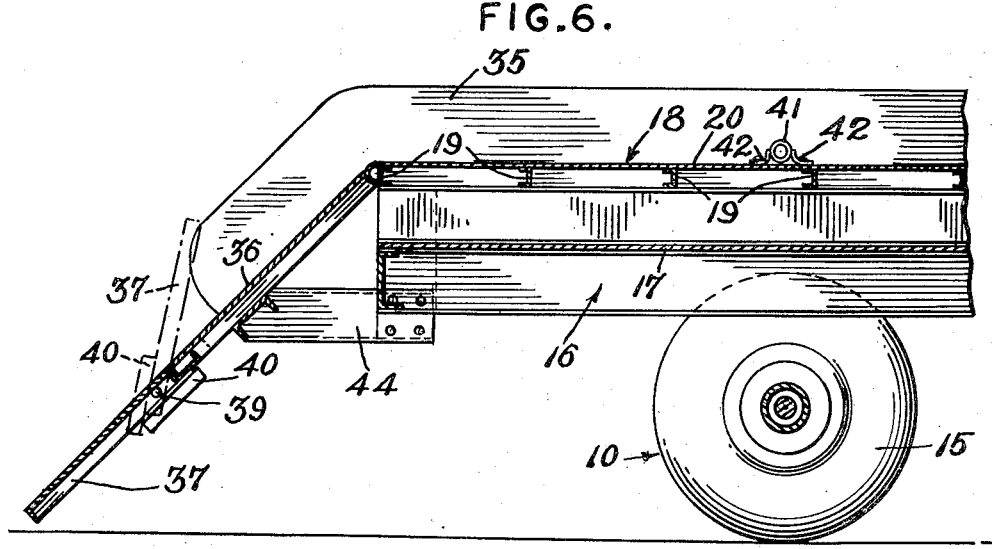

United States Patent Office 2,814,401
Patented Nov. 26, 1957

2,814,401

VEHICLE LOADING ASSEMBLY

Bernardo Mendez, San Sabastian, Puerto Rico

Application August 23, 1955, Serial No. 530,041

2 Claims. (Cl. 214—85.1)

This invention relates to a vehicle, such as a truck, and more particularly to a mechanism for use in loading a vehicle with goods or materials which are to be transported or moved from place to place.

The object of the invention is to provide a vehicle which is equipped with a mechanism for use in loading the vehicle with material, such as sugar cane which has been harvested in a field.

Another object of the invention is to provide a truck which is provided with a mechanism which permits the truck to be readily loaded with heavy materials and whereby the heavy loads can be lifted onto the truck with a minimum of effort and time.

A further object of the invention is to provide a self-loading vehicle which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the self-loading truck, constructed according to the present invention.

Figure 2 is a top plan view of the truck of the present invention.

Figure 3 is an end elevational view of the truck, with parts broken away and in section.

Figure 4 is a fragmentary elevational view, with parts broken away and in section, illustrating the sheave at the top of the tower.

Figure 5 is a view taken at right angles to the view shown in Figure 4.

Figure 6 is a sectional view taken on the line 6—6 of Figure 2.

Referring in detail to the drawings, the numeral 10 designates a vehicle such as a truck which includes the usual cab 11, engine 12, front wheels 14 and rear wheels 15. The numeral 16 designates the chassis of the vehicle, and the chassis 16 may support a floor 17.

Arranged above the chassis 16 is a platform 18 which includes a floor section 20 that may be supported by or secured to channel members 19, Figure 6.

There is further provided a tower 21 which includes a pair of inclined beams 22 that have their lower ends secured to the chassis 16 in any suitable manner, as for example by means of bolts or rivets, and vertically disposed braces 23 are provided for reinforcing the beams 22, Figure 2. A winch 24 is arranged adjacent the lower end of the tower 21, and an endless belt 25 is provided for rotating the winch 24, the belt 25 being operated by means of a power take-off mechanism 26 which can be driven by the vehicle engine 12 in any suitable manner. A cable 27 is trained over the winch 24 for a purpose to be later described.

Connected to the upper end of the tower 21 is a pin 28 which supports a sheave 29, and the cable 27 is trained over the sheave 29. A bracket 30, Figures 4 and 5, is secured to the upper end of the tower 21, and guide members or rollers 31 are journaled in the bracket 30, the guide members 31 having a portion of the cable 27 extending therethrough.

Secured to the free end of the cable 27 is a bar or L-shaped bracket 32, and extending from the bar 32 are a plurality of hooks 33 which are adapted to be arranged in engagement with a load 34 such as a bundle of sugar cane which has been harvested in a field. Side walls 35 extend upwardly from the truck body so as to prevent the load or material 34 from accidentally falling off the side of the truck.

There is further provided a means for facilitating the movement of the loads 34 into and out of the truck body, and this means comprises a plurality of inclined ramps 36 which extend rearwardly and downwardly from the rear end of the platform 18, Figure 6. Inclined legs 37 are pivotally connected to the ramps 36 by means of pivot pins 39 and ears 38, and a brace 40 is provided for maintaining the legs 37 in their proper aligned position when the legs 37 are in the downward position shown in Figure 6. A horizontally disposed tube or bar 41 is arranged on the platform 18 transversely of and intermediate the ends of the platform, and the bar 41 may be held in place by means of clamps or brackets 42, Figure 6. The bar 41 acts as a stop member to prevent the loads 34 from shifting forwardly too fast in the event the truck is arranged on a hill or incline.

A cover 43 may be arranged over the sheave 29, and braces 44 may be provided for reinforcing the ramps 36.

From the foregoing it is apparent that there has been provided a self-loading vehicle or truck which is especially suitable for use in hoisting heavy loads onto the body of the truck whereby the loads can be more easily handled with a minimum expenditure of effort and time. In use, the legs 37 can be swung downwardly from the broken line position of Figure 6 to the solid line position of Figure 6. Then, the hooks 33 can be arranged in engagement with the load 34 which may be a rolled up bale of sugar cane or the like which has been harvested in a field. Then, by actuating the power take-off 26, the belt 25 will rotate the sheave 24 and this will cause the cable 27 to pull up the load 34 up the legs 34, and then up the inclined ramps 36 and onto the platform 18. By continued operation of the winch 24, the load 34 can be moved to the front of the truck whereby additional loads can be stored behind the first load. The tube 41 helps to prevent the loads 34 from moving forwardly too fast. By reversing the direction of rotation of the winch 24, tension on the cable 27 can be released so that the loads 34 can be moved backwardly off of the truck at a controlled rate of speed.

The present invention is especially suitable for use in handling sugar cane, although it is to be understood that the device can be used with any desired material. The truck 10 may take its load to a transfer station for reloading into a larger truck or to the factory if it is a short distance away. With the present invention, the sugar cane can be transported and handled much easier and cheaper. The legs 37 may be swung upwardly when the truck is not being loaded or unloaded. The cable 27 may be made of heavy duty wire rope. The power take-off 26 can be operated by the engine 12. The guide members 31 prevent the cable 27 from slipping out of its proper position when the load is off center. In use, the truck may be backed up to the load to be hauled, and then the hooks 33 are arranged in engagement with the load 34 and then with the legs 37 in their down position, the cable 27 can be pulled in or wound on the winch 24 to thereby load the material 34 onto the truck. The truck can also be used for handling lumber, bales, bundles, gravel, sand, and the like and it can also be used for lifting, towing, or pulling down trees or other uses.

I claim:

1. A vehicle comprising a power take off, a chassis, a horizontally disposed platform arranged above said chassis, a tower extending upwardly from said chassis and including a pair of inclined beams and vertically disposed braces having their lower ends secured to said chassis for reinforcing said beams, a winch mounted on said chassis adjacent the lower end of said tower, a cable trained over said winch, belt and pulley means connecting said winch to said power take off, a pin supported by the upper end of said tower, a sheave journaled on the pin at the upper end of said tower and having said cable trained thereover, a cover arranged over said sheave, an L-shaped bar secured to the rear end of said cable, a plurality of hooks extending from said bar for engagement with a load being handled, a plurality of inclined ramps depending from the rear of said platform, inclined legs hingedly connected to the lower ends of said ramps, a brace for maintaining said legs in their proper aligned position when the legs are in the downward position, vertically disposed spaced parallel side boards extending upwardly from said platform, a horizontally disposed stop member extending transversely across said platform intermediate the ends thereof, a bracket secured to the upper end of said tower, a pair of guide members journaled in said bracket for the projection therethrough of said cable, said stop member serving to prevent loads from shifting forwardly too fast in the event the vehicle is arranged on a hill or incline.

2. A vehicle comprising a power take off, a chassis, a platform arranged above said chassis, a tower extending upwardly from said chassis and including a pair of beams, and braces secured to said chassis for reinforcing said beams, a winch mounted on said chassis, a cable trained over said winch, belt and pulley means connecting said winch to said power take off, a pin supported by said tower, a sheave journaled on the pin and having said cable trained thereover, a cover arranged over said sheave, a bar secured to said cable, a plurality of hooks extending from said bar for engagement with a load being handled, a plurality of ramps depending from said platform, legs hingedly connected to said ramps, a brace for maintaining said legs in their proper aligned position when the legs are in the downward position, side boards extending upwardly from said platform, a stop member extending transversely across said platform intermediate the ends thereof, a bracket secured to said tower, a pair of guide members journaled in said bracket for the projection therethrough of said cable, said stop member serving to prevent loads from shifting forwardly too fast in the event the vehicle is arranged on a hill or incline.

References Cited in the file of this patent

UNITED STATES PATENTS

| | | |
|---|---|---|
| 2,417,612 | Provenzano | Mar. 18, 1947 |
| 2,486,189 | McCormick | Oct. 25, 1949 |
| 2,487,305 | Bridegroom | Nov. 8, 1949 |
| 2,587,265 | Wright | Feb. 26, 1952 |
| 2,665,020 | Whittle | Jan. 5, 1954 |
| 2,705,081 | Jacobs | Mar. 29, 1955 |
| 2,708,041 | Young | May 10, 1955 |
| 2,712,877 | Wiley | July 12, 1955 |